United States Patent
Wu

(10) Patent No.: US 9,928,537 B2
(45) Date of Patent: *Mar. 27, 2018

(54) MANAGEMENT AND STORAGE OF DISTRIBUTED BOOKMARKS

(71) Applicant: Alibaba Group Holding Limited, George Town (KY)

(72) Inventor: Ce Wu, Hangzhou (CN)

(73) Assignee: Alibaba Group Holding Limited (KY)

( * ) Notice: Subject to any disclaimer, the term of this patent is extended or adjusted under 35 U.S.C. 154(b) by 0 days.

This patent is subject to a terminal disclaimer.

(21) Appl. No.: 15/244,863

(22) Filed: Aug. 23, 2016

(65) Prior Publication Data
US 2017/0046770 A1   Feb. 16, 2017

Related U.S. Application Data

(63) Continuation of application No. 14/603,642, filed on Jan. 23, 2015, now Pat. No. 9,454,555, which is a (Continued)

(30) Foreign Application Priority Data

Mar. 29, 2011   (CN) .......................... 2011 1 0076264

(51) Int. Cl.
G06F 17/30   (2006.01)
G06Q 30/06   (2012.01)

(52) U.S. Cl.
CPC ...... *G06Q 30/0633* (2013.01); *G06F 17/3033* (2013.01); *G06F 17/30345* (2013.01); *G06F 17/30884* (2013.01)

(58) Field of Classification Search
CPC ........... G06Q 30/0275; G06Q 30/0633; G06Q 30/0256; G06Q 10/087; G06Q 20/203;
(Continued)

(56) References Cited

U.S. PATENT DOCUMENTS 6,037,934 A    3/2000 Himmel
7,031,964 B1 * 4/2006 King ................. G06F 17/30884
(Continued)

FOREIGN PATENT DOCUMENTS

JP    2001357041 A    12/2001
JP    2001357069 A    12/2001
(Continued)

OTHER PUBLICATIONS

"Shard (database architecture", Wikipedia webpage, Mar. 24, 2011. Access at http://en.wikipedia.org/w/index.php?title=Shard_(database_architecture)&oldid=420458140 on Apr. 28, 2015.

*Primary Examiner* — Evan Aspinwall
(74) *Attorney, Agent, or Firm* — Van Pelt, Yi & James LLP

(57) ABSTRACT

Managing user bookmark information includes receiving a bookmark-related action request and determining a type of action associated with the bookmark-related action request and user information associated with the bookmark-related action request. In the event that the type of action corresponds to an add bookmark action, managing user bookmark information further includes generating a bookmark data record, the bookmark data record comprising the user information and information to be bookmarked; determining, using the user information, bookmark database information associated with a bookmark database to which the bookmark data record is to be stored, the bookmark database being one of a plurality of bookmark databases; generating index information based on the user information and the bookmark database information; storing the index information in an index database that is separate from the plurality of bookmark databases; and storing the bookmark data record in the bookmark database.

21 Claims, 10 Drawing Sheets

Related U.S. Application Data continuation of application No. 13/432,330, filed on Mar. 28, 2012, now Pat. No. 8,990,220.

(58) Field of Classification Search
CPC .... G06Q 30/0601; G06Q 50/12; G06Q 20/20; G06Q 30/0603; G06Q 30/0635; G06Q 30/0643; G06Q 30/08; G06F 3/0482; G06F 17/30289; G06F 17/3033; G06F 17/30345; G06F 17/30884
USPC ........................................................ 707/747
See application file for complete search history.

(56) References Cited

U.S. PATENT DOCUMENTS

| | | | |
|---|---|---|---|
| 7,792,703 B1 * | 9/2010 | Amidon | G06F 17/3087 705/26.1 |
| 8,001,077 B2 | 8/2011 | Kelley | |
| 8,392,482 B1 | 3/2013 | McAlister | |
| 2002/0156832 A1 | 10/2002 | Duri | |
| 2005/0177458 A1 | 8/2005 | Martineau | |
| 2005/0197927 A1 | 9/2005 | Martineau | |
| 2007/0067217 A1 | 3/2007 | Schachter | |
| 2007/0073746 A1 | 3/2007 | Ahn | |
| 2007/0078903 A1 | 4/2007 | Saito | |
| 2007/0136306 A1 | 6/2007 | Kelley | |
| 2007/0271498 A1 | 11/2007 | Schachter | |
| 2008/0027914 A1 | 1/2008 | Caputo | |
| 2008/0177858 A1 | 7/2008 | Aarnio | |
| 2009/0193096 A1 | 7/2009 | Boyer | |
| 2009/0287714 A1 | 11/2009 | Vasudevan | |
| 2010/0036849 A1 | 2/2010 | Choudhary | |
| 2011/0225165 A1 * | 9/2011 | Burstein | G06F 17/30336 707/741 |
| 2012/0016836 A1 | 1/2012 | Fender | |
| 2012/0030554 A1 | 2/2012 | Toya | |
| 2012/0233147 A1 | 9/2012 | Solheim | |

FOREIGN PATENT DOCUMENTS

| | | |
|---|---|---|
| JP | 2004110094 A | 4/2004 |
| JP | 2007272909 A | 10/2007 |
| JP | 2008097201 A | 4/2008 |
| WO | 2007020682 | 2/2007 |

* cited by examiner

MANAGEMENT AND STORAGE OF DISTRIBUTED BOOKMARKS

CROSS REFERENCE TO OTHER APPLICATIONS

This application is a continuation of co-pending U.S. patent application Ser. No. 14/603,642, entitled MANAGEMENT AND STORAGE OF DISTRIBUTED BOOKMARKS filed Jan. 23, 2015 which is incorporated herein by reference for all purposes, which is a continuation of U.S. patent application Ser. No. 13/432,330, now U.S. Pat. No. 8,990,220, entitled MANAGEMENT AND STORAGE OF DISTRIBUTED BOOKMARKS filed Mar. 28, 2012 which is incorporated herein by reference for all purposes, which claims priority to People's Republic of China Patent Application No. 201110076264.1 entitled A METHOD FOR PROCESSING AND SEARCHING USER BOOKMARK DATA filed Mar. 29, 2011 which is incorporated herein by reference for all purposes.

FIELD OF THE INVENTION

The present invention relates to the technical field of processing user information on websites. In particular, it relates to a method and an apparatus for processing and utilizing user bookmark data on large scale websites.

BACKGROUND OF THE INVENTION

Electronic commerce (EC) refers to a new business model that has become a part of worldwide commercial trading activities. According to this model, buyers and sellers, based on network communication technologies, can engage in various commercial activities in open Internet network environments and carry out online transactions such as purchases and payments, as well as various other business activities. E-commerce is broad in scope and can generally be divided into Business-to-Business (B2B), Business-to-Consumer (B2C), and Consumer-to-Consumer (C2C) models.

To improve the shopping experience of users when using e-commerce websites (also referred to as shopping websites), many shopping websites provide a user bookmark feature. When browsing a shopping website, users click on "Bookmark" (perform a bookmark-related action) on merchandise or shop pages. Information on products and online shops that they like are added to their own bookmark folder and stored on the server. Later, users may use their own bookmark folders for routine viewing, tracking, or purchasing of the products or shops that they like. Over time, each user's bookmark folder generally will contain a certain amount of product or shop information. Some active users may accumulate hundreds, even thousands of bookmarks for products or shops. Thus, in the case of large shopping websites, user bookmark folders are applications involving vast quantities of data. To make full use of the user bookmark folder, the system, in addition to adding, deleting, and updating user bookmark data, needs also to provide the user with a quick and effective method of finding the bookmark data that the user currently needs.

In some existing systems, user bookmark data is kept in a bookmark table. The bookmark table records the following: user ID, bookmark type (such as product or shop), name of bookmark content (such as product name or shop name), time bookmark added, and other basic information. Each time the user executes a bookmark-related action (e.g., clicking on an "Add Bookmark" button), data corresponding to a bookmark object is generated in the table. For example, after User A clicks "Bookmark" with respect to a certain product (such as mobile phone with the model number 12345), the system will generate the following information:

TABLE 1

| Item | User ID | Bookmark type | Name of bookmark content | Time bookmark added |
|---|---|---|---|---|
| Data information | A | Product | Mobile phone 12345 | Aug. 8, 2010, 10: 20 |

Based on this type of bookmark table in the existing systems, when the user wants to search the data information of a certain bookmarked object, he or she can obtain it only by accurately inputting the name of the bookmark content. For example, if a product was added to a bookmarks folder, then the only way to search for it is to accurately input the product name; if a shop was added to a bookmarks folder, then the only way to search for it is to accurately input the shop name. This is referred to as single condition search. Such a simple search method is better suited to situations where smaller quantities of bookmarks have been kept for shorter periods of time. As larger amounts of bookmarks are kept for longer periods of time, it becomes very difficult for the user to find the bookmark information he wants if the bookmark content information is not input accurately. The user will generally have to spend a lot of time and effort to find the bookmark data that he wants, which detracts significantly from the purpose of the bookmark folder.

To solve this problem, some shopping websites are now providing a tag classification feature for bookmark data. "Tag classification" refers to the addition of specific tags to user's bookmark objects, such as products or shops with the purpose of identifying the category to which the bookmark content belongs. This tag can be a product type, or it can be any category indicated by the user, e.g., "Mobile phones," "Food," "Buy next time," "Pay attention," etc. Although the tag classification method is simple and convenient, it is very arbitrary. Thus, as time goes by, redundant categories tend to be created, and the content placed in them can easily become confused. Therefore, users who employ such schemes still have trouble finding the bookmark data they want.

Another way to solve the problems that arise when users are only able to employ single condition searches on bookmark data is to enable users to search bookmark data using multiple conditions. For example, a relational database query approach can be used. That is, during a search, information in the bookmark table is used to make queries associated with the current shopping website's user database, product database, and shopping database. For example, the system uses a product name to link to the shopping website's product database, and queries for product information corresponding to the product information in the user's bookmarks. Or the system uses a shop name to link to the shopping website's shop database and queries for shop information corresponding to the shop information in the user's bookmarks. However, in the case of large-scale shopping websites, product databases, shop databases, user databases, and bookmark databases are vast and ever-increasing in size. The databases of many shopping website already have data entries in the tens or hundreds of millions. It is now very difficult to carry out effective relational queries between multiple databases containing so much data. Even if it were possible to implement relational queries between such huge databases, the searches would be very slow and would lead to enormous waste in terms of system performance and resources. In addition, the corresponding data in the product database, shop database, and user database relating to the bookmark data can be re-edited and revised and even deleted, with the result that the user will have difficulty obtaining relevant information after the bookmark is saved. This further diminishes the usefulness of the bookmarks.

An efficient and quick way to process and search vast amounts of data associated with user bookmarks at large shopping websites is therefore needed.

BRIEF DESCRIPTION OF THE DRAWINGS

Various embodiments of the invention are disclosed in the following detailed description and the accompanying drawings.

DETAILED DESCRIPTION

Figure 1:
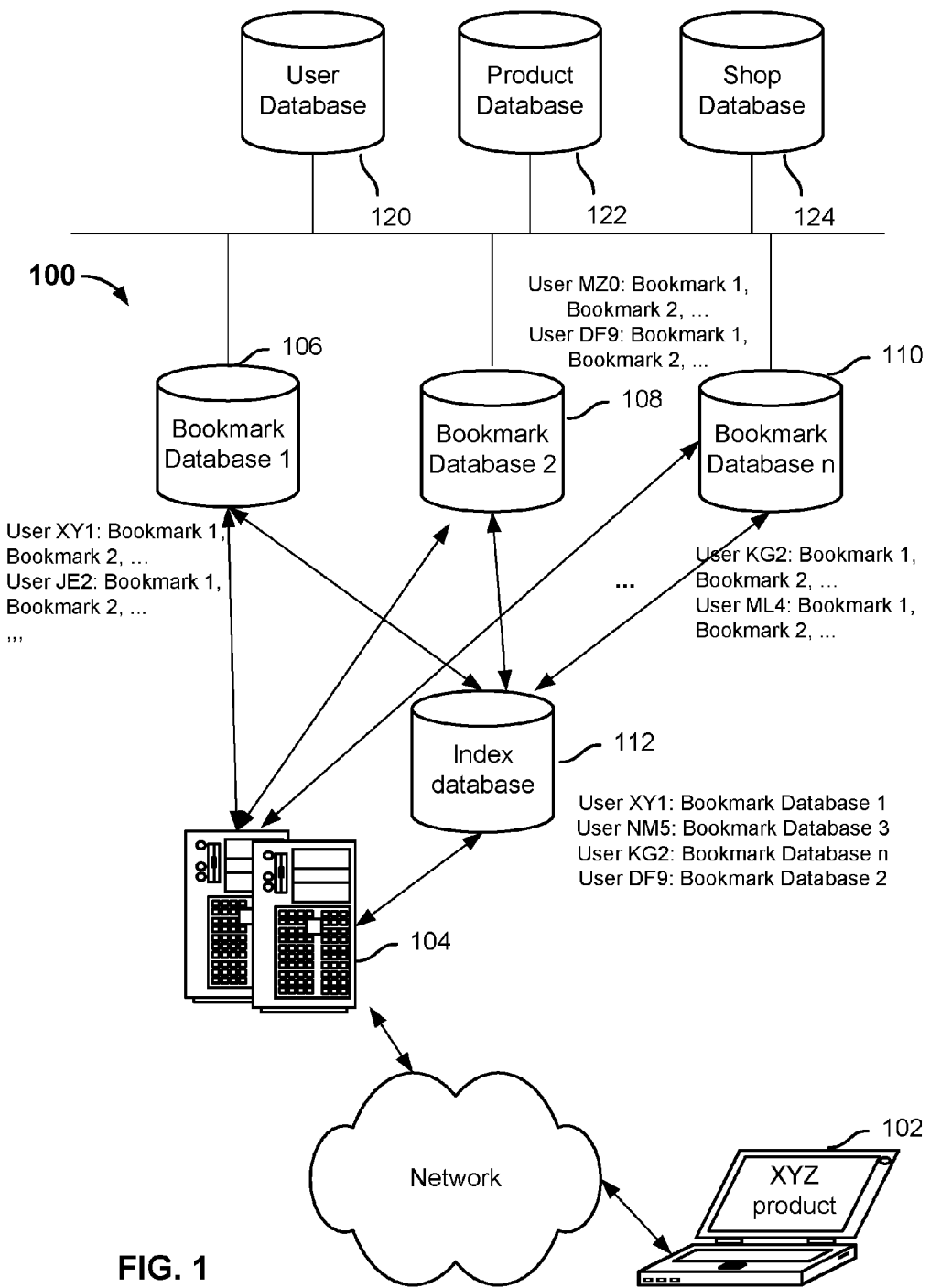
FIG. 1 is a block diagram illustrating an embodiment of a bookmark management system.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

For large-scale shopping websites, user bookmark folders are applications involving vast amounts of data. To conserve system resources and improve system performance, a distributed storage architecture is described. In some embodiments, a large amount of user bookmark data at a shopping website is saved according to a distributed architecture, in separate databases located at different servers. A separate index database is used for tracking in which bookmark database a user's bookmark data is stored. Data processing actions, such as adding, deleting, updating, and searching can be completed in the corresponding bookmark database, thereby conserving system resources and improving performance.

In the distributed storage architecture, vast amounts of user bookmark data are stored separately in bookmark databases on different servers. Because the bookmark application is user-oriented, in some embodiments, storage locations for bookmarks are designated according to user-based partitioning dimensions such that the same user's bookmark data is found in the same bookmark database.

FIG. 1 is a block diagram illustrating an embodiment of a bookmark management system. In this example, a user of a shopping site accesses the site using a client device 102. The client device can be a laptop computer, a desktop computer, a tablet, a mobile device, a smart phone, or any other appropriate computing device. In some embodiments, a web browser or a standalone application is installed at each client and enables a user to access, via a network (e.g., the Internet), a shopping site (e.g., an e-commerce website) hosted by server 104. Server 104 may comprise a single or multiple devices. In the diagram shown, server 104 performs bookmark processing and management functions such as receiving bookmark-related action requests from the user, creating and saving bookmarks, as well as retrieving bookmarks. The bookmarks are distributed across a plurality of bookmark databases (e.g., 106, 108, 110, etc.). The number of bookmark databases depends on system implementation and can vary in different embodiments. In some embodiments, each bookmark database is implemented on a different server or a different set of servers (e.g., a different server cluster) (not shown in diagram). As will be described in greater detail below, a bookmark is associated with (e.g., stored in) one of the bookmark databases. The particular bookmark database in which a bookmark is stored is saved as index information in an index database 112.

In this example, bookmark records saved in the bookmark databases include information obtained from backend content databases such as user database 120, product database 122, and shop database 124. As will be described in greater detail below, when information in the content databases is updated, the database server associated with the bookmark database detects the update and synchronizes information in the bookmark database accordingly.

Figure 2:
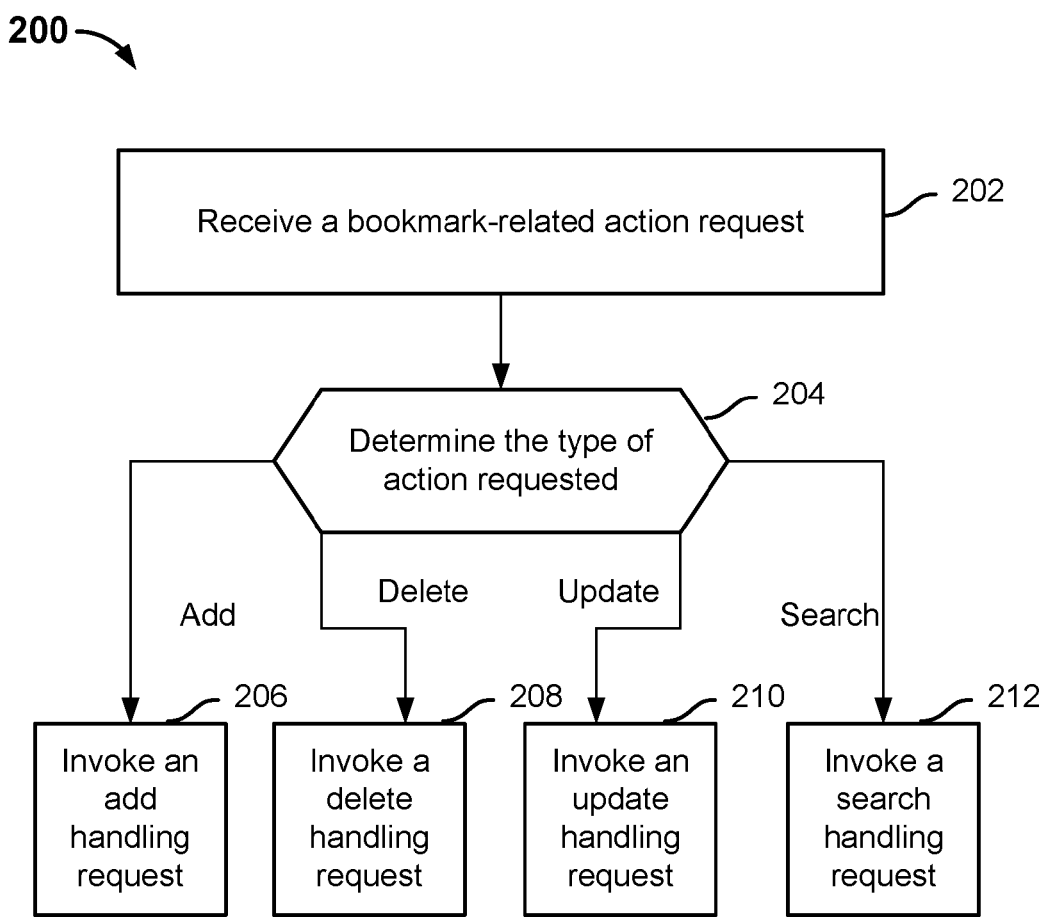
FIG. 2 is a flowchart illustrating an embodiment of a process for managing bookmark data.

FIG. 2 is a flowchart illustrating an embodiment of a process for managing bookmark data. Process 200 can be performed on a system such as 100 or 800.

At 202, a bookmark-related action request is received. Examples of the bookmark-related action include adding, deleting, updating, and searching for bookmarks. In some embodiments, the request includes data that is formatted according to a pre-specified protocol, and includes information such as user identification information, the type of action requested, and other applicable data such as bookmark identification information, or bookmark content information.

At 204, the type of action that is requested is determined. In some embodiments, this is determined by examining a specific field in the request data packet, or by examining the context in which the request is made. Depending on what type of action is requested, a corresponding handling function is invoked. Specifically, in the event that the bookmark-related action request corresponds to an add request, a delete request, an update request, or a search request, the handling function that is invoked corresponds to an add handling request 206, a delete handling request 208, an update handling request 210, or a search handling request 212, respectively.

Figure 3:
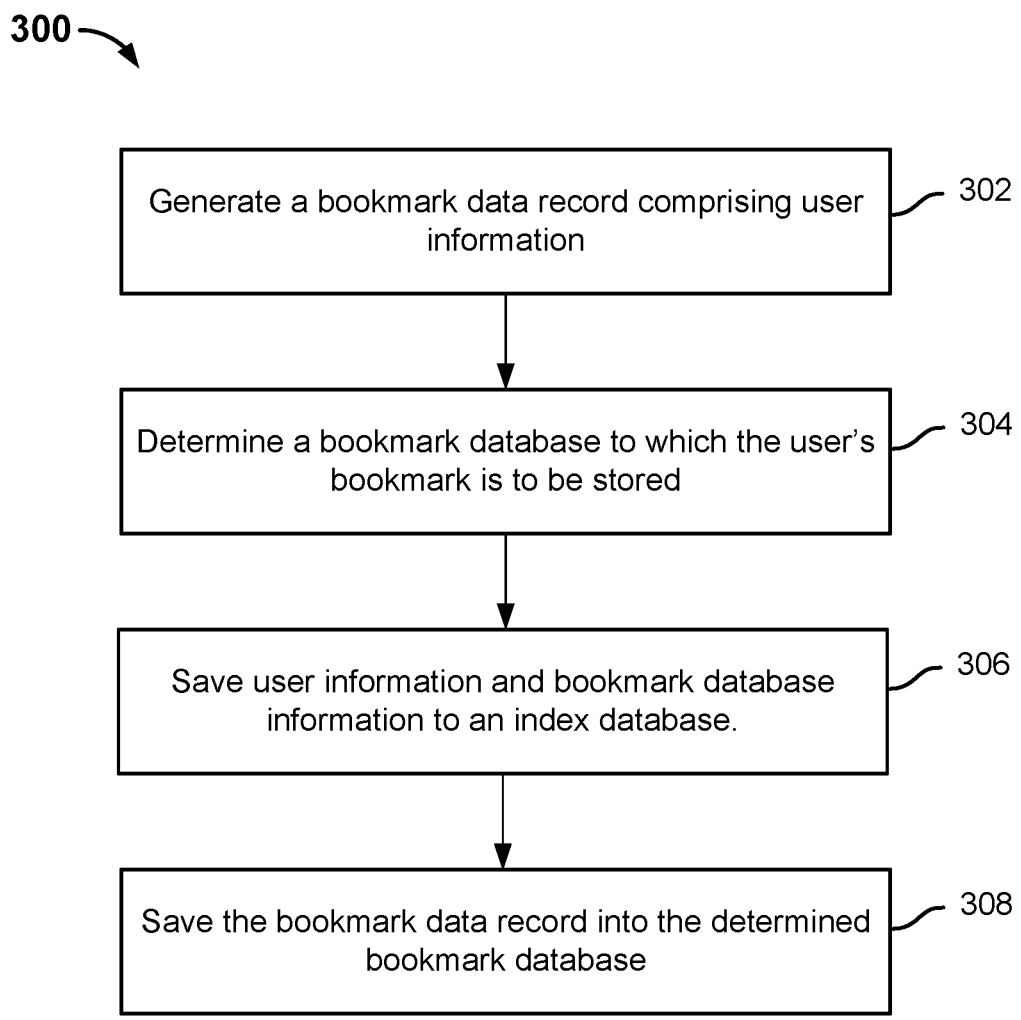
FIG. 3 is a flowchart illustrating an embodiment of a process for handling an add bookmark request.

FIG. 3 is a flowchart illustrating an embodiment of a process for handling an add bookmark request. Process 300 can be used to implement 206 of process 200, when it is determined that the bookmark-related action request corresponds to an add bookmark request.

At 302, a bookmark data record is generated. The bookmark data record includes user information (e.g., a user ID), the bookmark content information (e.g., product ID, shop ID), and any other information that is suitable for storage in a bookmark database.

In some embodiments, the bookmarks saved by the same user are saved to the same bookmark database. Since a number of bookmark databases are available, at 304, based on the user information, the specific bookmark database to which the user's bookmarks are to be stored is determined. Details of how the determination is made are described below.

At 306, the user information and bookmark database information (e.g., a bookmark database ID) pertaining to the specific bookmark database for storing this user's bookmarks is stored in an index database. The user ID can be used as the key to look up the corresponding bookmark database information in the index database.

At 308, the bookmark data record is saved into the determined bookmark database.

In this example, the bookmark-related actions are performed by the user via a user interface implemented on the website. For example, while browsing through a shopping website, a user clicks a "Bookmark" (and thereby performs a bookmark-related action) on a webpage relating to a product or a shop and thereby creates a user bookmark pertaining to the product or the shop. The user bookmark data comprises one or more user bookmark data records.

In some embodiments, a classification technique is used to determine which of the plurality of bookmark databases is used for saving the bookmark data of each user. The bookmark data record can include bookmark content basic information, which can include user information as well as other basic and/or extended information. In such a case, the bookmark database information for saving said bookmark data record is determined based on the user information.

As a specific example, the user information can be a user identifier (ID). The system can assign a piece of bookmark database information for saving the bookmark data record by generating a character string of a preset length according to the user's login name. Calculations are then performed on the character string according to a preset technique to obtain a result that serves as bookmark database information.

Refer to system 100 of FIG. 1 for an example. Assume that there are n bookmark databases implemented on n servers (n being an integer). Assume that the bookmark databases have identifiers of 1 to n. When adding the bookmark data record of a user, the system obtains permanent user information such as the user's ID and time of user registration. It generates a 64-bit-long character string based on the user information. This character string is generally in the form of an alphanumeric string, e.g., jessiebuy20101201. Using this user information character string as input, the system invokes a hash function, such as the MD5 function, which generates a fixed output value for the same input. The final result is used as the value of the corresponding server i and bookmark database i (i being an integer between 1 to n). If the numerical value that is obtained is 2, then the identifier of the server and bookmark database where the data is to be saved is 2. The system generates index information based on the user information and bookmark database n and finds the corresponding server i and bookmark database i. If the server identifier is 2, the current bookmark data record is saved in the bookmark database corresponding to the bookmark database identifier 2. In some embodiments, an index entry includes the user's user ID, the ID of the bookmark database to which the bookmark record is stored, and optionally the ID or location of the bookmark record within its corresponding bookmark database. The index entry is saved in an index database. Table 2 illustrates an example format of an index entry.

TABLE 2

| Field | Type |
| --- | --- |
| User ID | Varchar (n) |
| Database ID | Varchar (n) |

The above method of assigning bookmark database information is merely an example. Persons skilled in the art may employ any other method depending on actual conditions. For example, a method for determining the bookmark database information by sampling the user information character string can be used. The present application imposes no limits on these matters.

In some embodiments, a distributed storage architecture is implemented to process vast quantities of user bookmark data. In the distributed storage architecture, index information and bookmark data records are stored separately. In this way, it is possible to provide data structures for more bookmark-related service functions using a small amount of storage space for any given amount of data, and thereby conserving system resources. Moreover, it is not necessary to have real-time links to external content data (such as products, shops, and sellers). Nor are relations of data dependence required. Thus, it provides more responsive storage and searches, and improved performance.

Figure 4:
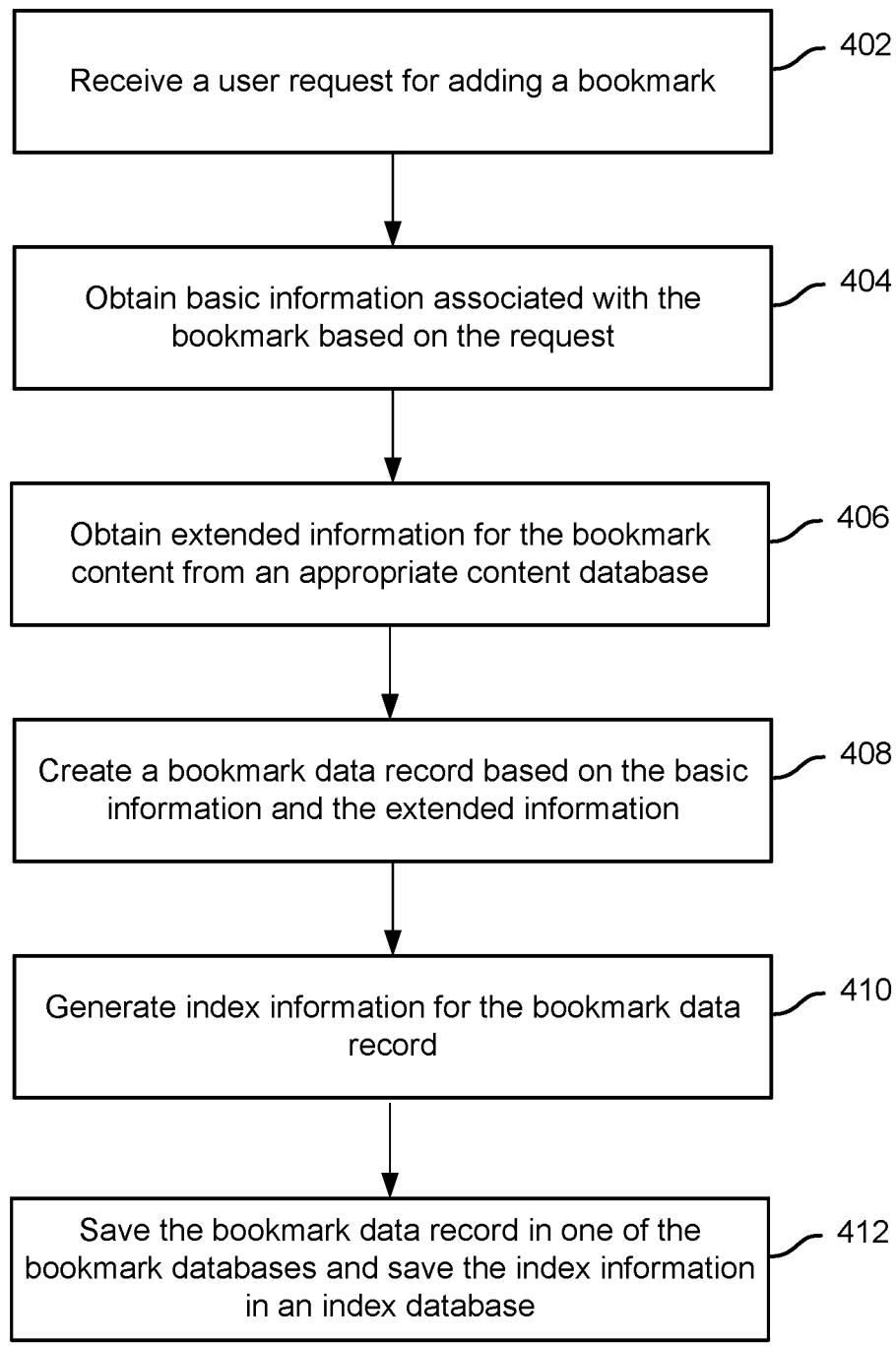
FIG. 4 is a flowchart illustrating another embodiment of a process for handling an add bookmark request.

FIG. 4 is a flowchart illustrating another embodiment of a process for handling an add bookmark request. Process 400 can be used to implement 206 of process 200.

At 402, a user request for adding a bookmark is received. In some embodiments, the user request is made when a user identifies a product or a shop of interest, via a user interface facility such as an "Add Bookmark" button. The request is sent over the network, and the request data is formatted to include various fields that store basic information about the bookmark, such as information of the user making the request, a bookmark content identifier, and a bookmark record identifier. As used herein, the user information includes permanent user information such as user ID and user registration time. The bookmark record identifier is a unique identifier (e.g., a UUID) generated for the current bookmark data record. The bookmark content identifier includes identification information such as a product ID and/or a shop ID that corresponds to the product and/or the shop the user is trying to bookmark.

At 404, based on the request, basic information associated with the bookmark is obtained. In this example, the basic information comprises user information, a bookmark content identifier, and a bookmark record identifier. The information is extracted from predefined fields in the request.

In some embodiments, the basic information further comprises: a bookmark type (e.g., information indicating whether the bookmark is for a product or for a shop), a bookmark time (e.g., the time at which the bookmark is added), a data valid label indicating whether the bookmark is still valid, and an expiration time indicating when the bookmark expires.

At 406, based on the bookmark content identifier, an appropriate content database is determined, and extended information for the bookmark content is looked up from the appropriate content database.

A content database is a backend database for a large shopping website. Examples include product databases storing information about the products, or shop databases storing information about the online shops. The extension information can be based on the type of bookmark content. For example, when the user is trying to bookmark a product (i.e., the bookmark content is a product), the content database corresponds to a products database, and the extended information can include one or more of the following: product type, product price, and product publication time. When the user is trying to bookmark a shop (i.e., the bookmark content is a shop), the content database corresponds to a shop database, and the extension information can include one or more of the following: the shop's name, the seller's name, the shop's main business, the seller's credit rating, the shop's promotional information, and user comments about the shop.

At 408, a bookmark data record is created based on the basic information and the extended information. In some embodiments, this step includes combining the bookmark content basic information and extended information into a bookmark data record.

Table 3 illustrates an example format of a bookmark data record. Different fields or formats can be used in other embodiments. In this example, the first 7 fields include basic information, and the remaining fields include extended information.

TABLE 3

| Field | Type | Remarks |
| --- | --- | --- |
| Bookmark ID | Varchar (n) | Basic information field, a unique ID for identifying bookmark data record |
| User ID | Varchar (n) | Basic information field |
| Bookmark type | Varchar (n) | Basic information field, includes bookmarked product or bookmarked shop |
| Bookmark content ID | Varchar (n) | Basic information field, corresponding to bookmark type; value can be product ID, shop ID, or seller ID |
| Time bookmark added | Varchar (n) | Basic information field |

TABLE 3-continued

| Field | Type | Remarks |
| --- | --- | --- |
| Valid? | Varchar (n) | Basic information field, indicates whether this bookmark data record is valid or not |
| Expiration time | Varchar (n) | Basic information field, indicates when product was removed from shelves or deleted, or when shop closed |
| Shop name | Varchar (n) | Extended information field, for searching bookmarked products according to shop name |
| Seller name | Varchar (n) | Extended information field, for searching bookmarked products or bookmarked products according to seller name |
| Product type | Varchar (n) | Extended information field, for searching bookmarked products according to product type |
| Product price | Varchar (n) | Extended information field, for searching bookmarked products according to product price |
| Product publication time (update time) | Varchar (n) | Extended information field, for searching bookmarked products according to product publication information |
| Shop main business | Varchar (n) | Extended information field, for searching bookmarked products according to the shop's main line of business |
| Seller credit rating | Varchar (n) | Extended information field, for searching bookmarked products according to seller credit rating |
| Shop promotion? | Varchar (n) | Extended information field, for searching promotional products of bookmarked products |
| User comment information | Varchar (n) | Extended information field; comment information is the comment information input by the user concerning the current bookmark data record, for searching comment content |

The above bookmark data record is only an example. The bookmark content's basic information and extended information can be configured by persons skilled in the art to conform to actual conditions. As can be seen from Table 3 above, certain information that is stored in the content database is duplicated and stored as bookmark fields. In some embodiments, to avoid excessive data volume, no more than 20 extended information fields are included.

At 410, index information for the bookmark data record is generated. In some embodiments, the index information comprising user information, bookmark record identifier, and bookmark database information indicating which one of the databases is used to save the current bookmark data record. In some embodiments, the bookmark database information is determined by applying a hash function to the user information (e.g., a user ID).

At 412: in accordance with the bookmark database information, the current bookmark data record is saved into the corresponding bookmark database, and the index information is saved into an index database. In some embodiments, a bookmark record identifier (e.g., the row ID returned by the bookmark database upon successful saving of the bookmark data record) is included in the index information and saved.

In this example, data is stored in the backend in two parts. One part is the index information, and the other part is the bookmark data record itself. In this example, the index information includes user information, bookmark record identifiers, and bookmark database information. The current bookmark data record is saved at a specific location in the bookmark database, as specified by the index information.

Since the bookmark data is saved in a single data table, when a query is made, no cooperative querying of external data is needed. Moreover, there is no data dependence relation. However, if one uses a single server and a single database, it will still be very difficult to meet the requirements of large shopping websites, which can have over one hundred million records. Therefore, the present embodiment employs a distributed storage strategy in addition to the single table design. That is, the bookmark data of different users may be stored in different servers and databases, yet the bookmark data of any one user will be stored in the same server and database.

The above technique makes it possible to achieve diversified bookmark data searches based on the simple database storage architecture without having to conduct queries and searches in multiple databases (e.g., a user database, a shop database, and a bookmark database) comprising hundreds of millions of entries related to the website through the bookmark table information. As a result, users can find the bookmark data they need quickly and efficiently. The present technique thus increases the utility of the user bookmark folder and enhances the bookmark experience for users. Moreover, it can conserve system resources and improve system performance.

In some embodiments, after the bookmark data record is generated, a data record updating mechanism can be employed to ensure the accuracy and validity of user bookmark data. An example mechanism includes a bookmark update function implemented on the database server. The bookmark update function is invoked whenever updates should be made to the bookmark data records. In some embodiments, a user interface (e.g., an "Update Bookmark") button or the like is implemented. When a user wishes to get the most up-to-date information pertaining to his bookmarks, he can invoke the bookmark update function via the user interface (e.g., by clicking the button). In some embodiments, the update function is invoked periodically and automatically by the system to keep bookmark content up-to-date. More commonly, because the extended information of the user bookmark data record was extracted from the content database, the update function is called when a database trigger (e.g., a database trigger that is set when information in the content database changes) is invoked.

Figure 5:
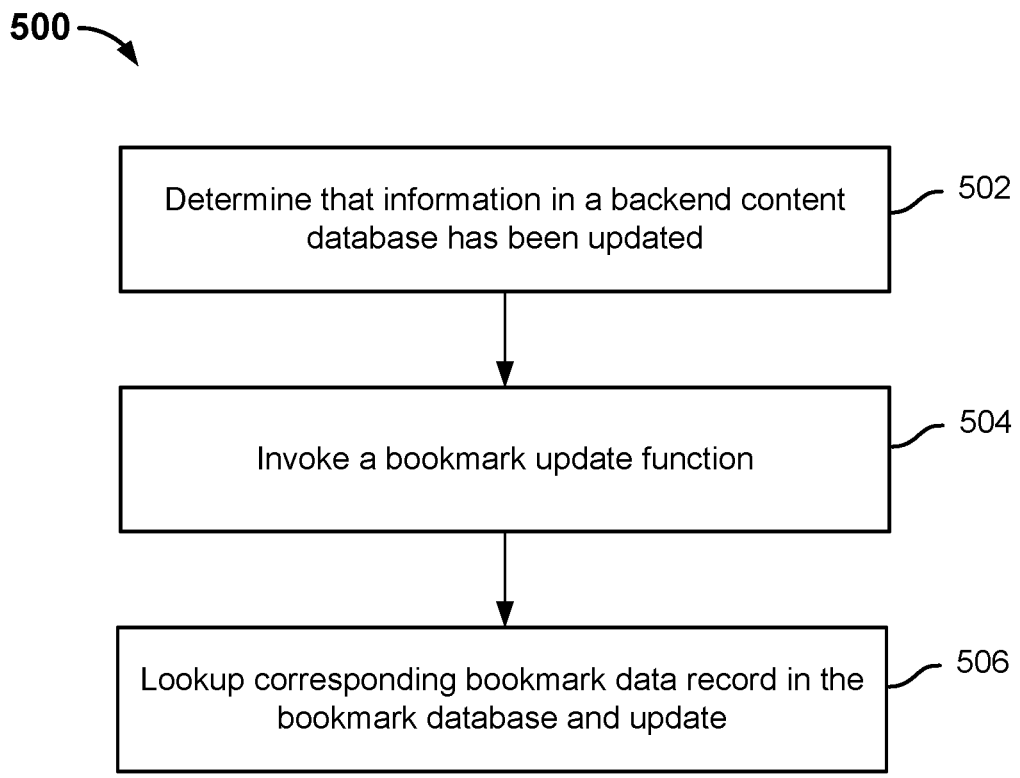
FIG. 5 is a flowchart illustrating an embodiment of a process for updating bookmarks.

FIG. 5 is a flowchart illustrating an embodiment of a process for updating bookmarks. Process 500 can be used to implement 210 of process 200.

At 502, it is determined that information in a backend content database (e.g., a product database or a shop database) has been updated. In some embodiments, a trigger is configured to detect the UPDATE command in the content database and capture information about the update, such as the ID of the changed content (e.g., product or shop). When an UPDATE command is received and the trigger is set off, it indicates that the content database has been updated.

At 504, a bookmark update function is invoked. In various embodiments, the bookmark update function can be implemented on the database servers or on a separate server. In this example, the parameters of the bookmark update function include the product ID or the shop ID of the changed content.

At 506, bookmark data records that correspond to the product ID or the shop ID are looked up in the bookmark databases using the product ID or the shop ID, and updated.

For example, when a product's price changes in the product database, the event trigger sets off and the bookmark update function is invoked. Using the product ID, corresponding bookmark data records are looked up and their corresponding price fields are updated accordingly to update the new price in the bookmark database records. As another example, when a certain shop whose information is stored in the shop database in the backend of a shopping website closes, the bookmark update function is invoked to record the expiration status and expiration time.

Figure 6:
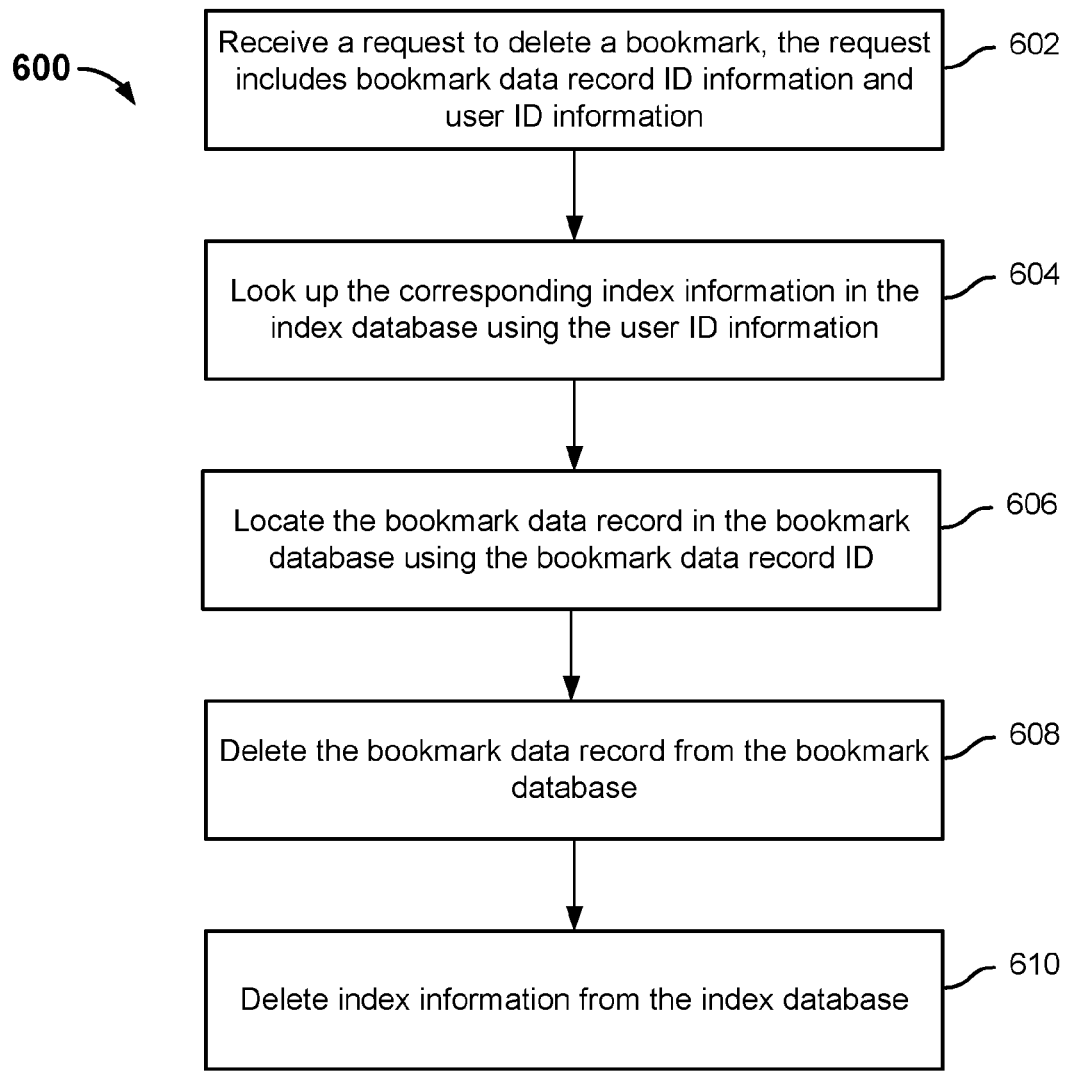
FIG. 6 is a flowchart illustrating an embodiment of a process for handling a request to delete a bookmark.

FIG. 6 is a flowchart illustrating an embodiment of a process for handling a request to delete a bookmark. Process 600 can be used to implement 208 of process 200.

At 602, a request to delete a bookmark is received. The request can be made by a user via a user interface (e.g., via a "Delete" button that is implemented in connection with a bookmark folder). In this example, the request includes bookmark data record ID information and user ID information.

At 604, the corresponding index information is looked up in the index database using the user ID information.

Since the index information includes the bookmark database information (e.g. ID) of the bookmark database storing this user's bookmark data records, at 606, the bookmark data record is located in this bookmark database, using the bookmark data record ID.

At 608, the bookmark data record is deleted from its corresponding location in the bookmark database.

At 610, the index information is deleted from the index database.

For example, when a user clicks "Delete" for a bookmark data record in a bookmark folder, the system can then look up, in accordance with the bookmark record identifier for this bookmark data record, the index information having this bookmark record identifier and obtaining from this index information the bookmark database information corresponding to this bookmark record identifier. It can then go to the bookmark database and delete the current bookmark data record and delete the current index information that is based on the bookmark record identifier from the index database.

Figure 7:
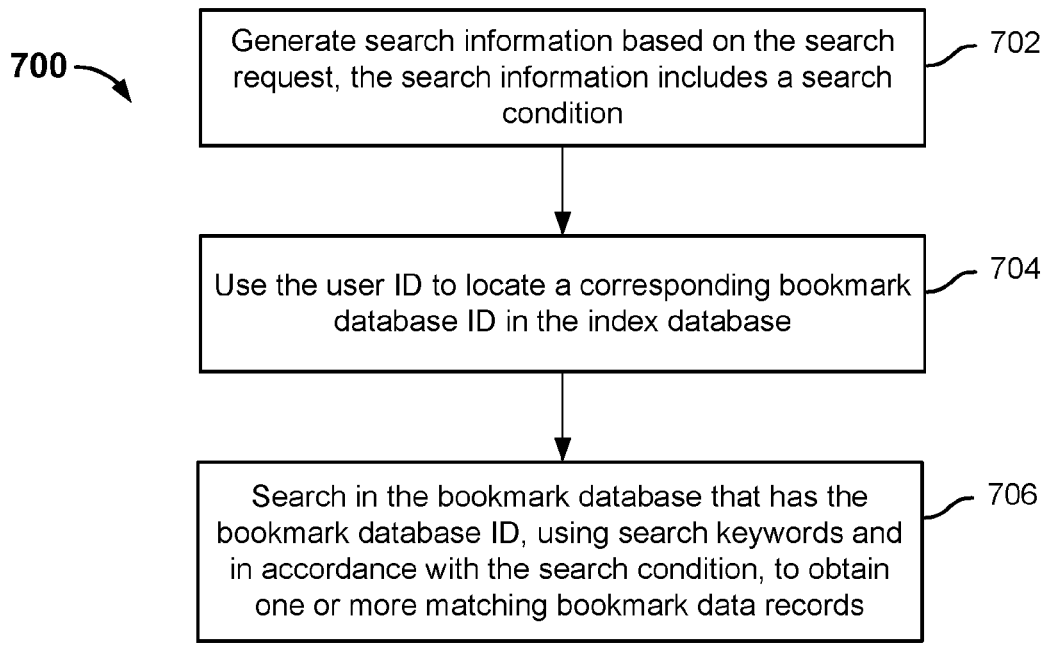
FIG. 7 is a flowchart illustrating an embodiment of a process for searching bookmark data.

FIG. 7 is a flowchart illustrating an embodiment of a process for searching bookmark data. Process 700 can be used to implement 212 of process 200. In this example, user bookmark data is stored in bookmark databases on different servers, and the bookmark data of any one user is stored in the same bookmark database. The bookmark data of a single user includes one or more bookmark data records. Each bookmark data record has a corresponding piece of index information, which includes a user ID and a bookmark database ID for saving and locating the current bookmark data record.

Upon receiving a search request, at 702, search information for bookmark data is generated based on the search request. In some embodiments, the search request includes user ID and a set of search keywords, which are extracted and included with the search information. In some embodiments, the search information further includes search conditions specifying which fields in the bookmark data record to perform the search. Examples of how to generate the search information are described in greater detail below.

At 704, using the user ID, the corresponding bookmark database ID that stores this user's bookmarks is looked up in the index database. In some embodiments, a corresponding index entry is located in the index database using the user ID. The index entry includes the bookmark database ID for storing the bookmarks for this user.

At 706, a search is performed in the bookmark database with the bookmark database ID, using search key words and in accordance with the search condition, to obtain one or more matching bookmark data records. The matching bookmark data records are presented to the user.

In some embodiments, the search request includes user information and search key words. In such a case, step 702 includes generating the corresponding search conditions based on the character type of the search key words.

For example, a bookmark data record can include the following information: product type, product price, product publication time, shop name, seller name, shop main business, seller credit rating, shop promotional information, user comments information. A search condition based on the character type of the search key words specifies that:

1) If the character type of the search key word is purely numeric, then search in product prices and shop promotional information.

2) If the character type of the search key word is not purely numeric and includes other characters or text, then search in product type, product publication time, shop name, seller name, shop main business, seller credit rating, and user comments information.

For example, a user inputs the search key word "2011 spring apparel" in the search box on the bookmark folder page. Analysis of the type of search key words concludes that the search keywords contain non-numeric text. According to the search condition described above, the search keywords should be used to conduct a search in product type, product publication time, shop name, seller name, shop main business, seller credit rating, and user comments information fields of the bookmark data. In this example, if the search key words match a shop name (either exactly or partially depending on implementation), then bookmarked products associated with the shop name are output; if the search key words match a seller name, then bookmarked products associated with the seller name are output; if the search key words match a product type, then bookmarked products associated with the product type are output; if the search key words match a product publication time, then bookmarked products that comply with the product publication time range are output; if the search key words match a shop's main business, then the bookmarked products associated with this shop's main business category are output; if the search key words match a seller's credit rating, then bookmarked products that comply with this credit rating are output; if the search key words match user comment information, then bookmarked products and shops that contain this comment information are output.

As another example, a user inputs the search key word "200" in the search field on a bookmark page. Analysis of the search key word's type indicates that it contains a pure numerical type. According to the search condition specified above, this search key word is used to search in product price and shop promotional information. In this example, the search key word is matched with price, and bookmarked products associated with the correct price range are output; further, the search key word is matched with any promotional information, and matching promotional products are output.

In some embodiments, the search request includes user information, search type, and search key words. In this situation, step 702 includes generating the corresponding search conditions based on the search type.

For example, the bookmark data record can include at least one of the following: product type, product price, product publication time, shop name, seller name, shop main business, seller credit rating, shop promotional information, and user comment information. Accordingly, the search type can be product search, shop search, or extended search. In one example, the search condition based on the search type specifies that:

1) if the search type is product search, then search in shop name, seller name, product type, product price, and product publication time;

2) if the search type is shop search, then search in seller name, shop main business, and seller credit rating;

3) if the search type is extended search, then search in user comments information and shop promotional information.

In one example, the user selects the product search type on the bookmark page and enters a set of search key words. The system generates search conditions for searching in shop name, seller name, product type, product price, and product publication time. Specifically, it searches for any shop name that matches the search key words, and outputs bookmarked products associated with the matching shop name; it searches for any seller name that matches the search key words, and outputs bookmarked products associated with the matching seller name; it searches for any product type that matches the search key words, and outputs bookmarked products associated with the matching product type; it searches for any product price that matches the search key words, and outputs bookmarked products that are priced at or lower than the matching product price; it searches the search key words according to product publication time and then outputs bookmarked products that comply with the product publication time.

As another example, the user selects the shop search type on the bookmark page and enters a set of search key words. The system generates search conditions for searching in seller name, shop main business, and seller credit rating. Specifically, it searches for any seller names that match these search key words, and outputs bookmarked products associated with the seller name; it searches for any matching shop main business that matches these search key words according to shop main business, and outputs bookmarked products associated with the matching shop main business category; it searches for any seller credit rating that matches these search key words, and outputs the bookmarked products that comply with the matching credit ratings.

As another example, the user selects extended information as the search on the bookmark page, and enters a set of search key words. Accordingly, the system generates search conditions for searching in comment information and shop promotional information. Specifically, it searches for any user comment information that matches the search key word, and outputs bookmarked products and shops that contain the matching comment information; it searches for any shop promotion information that matches the search key words, and outputs bookmarked products that comply with the promotional conditions in bookmarked products.

The present embodiment of the invention meets the multidimensional query needs of users by taking key field data (specifically, extended information of bookmark content) that serves as search conditions from the content database, duplicating the key field data in the bookmark data record, and establishing corresponding indexing and updating mechanisms. The present embodiment of the invention can provide users with diversified search conditions and search methods, as in the searches of content associated with bookmarked products discussed in the above examples (including shop and seller searches of bookmarked products, product type searches of bookmarked products, price searches of bookmarked products, and publication time searches of bookmarked products), searches of content associated with bookmarked shops (including seller searches of bookmarked shops, main business searches of bookmarked shops, and credit rating searches of bookmarked shops), and searches of extended content within bookmark content (including searches of promotional products of bookmarked shops, and user comment information searches). In this way, the practical needs of users are met, and the bookmark folder becomes easier to use. The techniques described above are examples only. Persons skilled in the art can expand search conditions however they wish in order to comply with business needs. The present invention imposes no limits with respect to these matters.

What needs to be explained is that the present application does not limit the algorithms employed in the bookmark data searches. Persons skilled in the art may select different search algorithms according to the volume of actual data. The present invention imposes no limits with respect to these matters.

Previously, a process of user bookmark data search typically involves the following steps: 1) The user selects "Search according to seller name" on the bookmark web page and inputs search key words; 2) The system conducts a search in the website's user database according to the input search key word. The search produces a list of seller names fuzzy-matched to the search key word; 3) The system conducts a search in the website's shop database according to the seller names in the list. The search produces a list of appropriate shop names; 4) The system searches in the bookmark database according to the shop names in the list. The search locates bookmarked products of the appropriate shop names in the user's bookmark folder; 5) The located bookmarked product records are fed back to the user.

In contrast, an example process of user bookmark data searching according to an embodiment of the present invention involves the following: 1) The user selects "Search according to seller name" for bookmarked products on the bookmark web page and inputs search key words; 2) Based on the user's user ID, the system extracts the corresponding bookmark database information from index information; 3) Based on the user ID and the search key words, the system searches for content associated with the "seller name" field in the corresponding bookmark database and conducts fuzzy-matching to identify bookmarked product records associated with sellers with matching seller names; 4) The system displays with the located bookmarked product records to the user.

In searches of the prior art, user bookmark data searches need to be conducted in three databases (user database, shop database, and bookmark database) that may comprise 100 million entries or more. These three databases contain very large volumes of data. In fact, system performance is such that such searches may not be feasible. Nor can the system support bookmark data searches involving so many business-related conditions. In contrast, the distributed data storage architecture described herein takes key field data (extended information of bookmark content) to serve as search conditions, duplicates the key field data from the content database, and uses it to serve as a part of the bookmark data record. Corresponding indexing and updating mechanisms are established, and storage operations in separate databases are performed according to the user's identification information. Thus, the techniques described herein solve the problem of searching vast amounts of data, and realize a diversified bookmark data search scheme for users that enables users to find the bookmark data they need quickly and efficiently, thus increasing the utility of the user bookmark folder and enhancing the bookmark experience for users. It can also conserve system resources and improve system performance.

To simplify the descriptions of the various method embodiments described above, they were represented as combinations of series of actions, but persons skilled in the art should know that the present application is not limited by the sequence of actions described. Some steps may be executed simultaneously or in other sequences according to the present application. Secondly, persons skilled in the art should also know that the embodiments described in the Description are all preferred embodiments, and the actions and modules that they touch upon are not always required by the present application.

Figure 8:
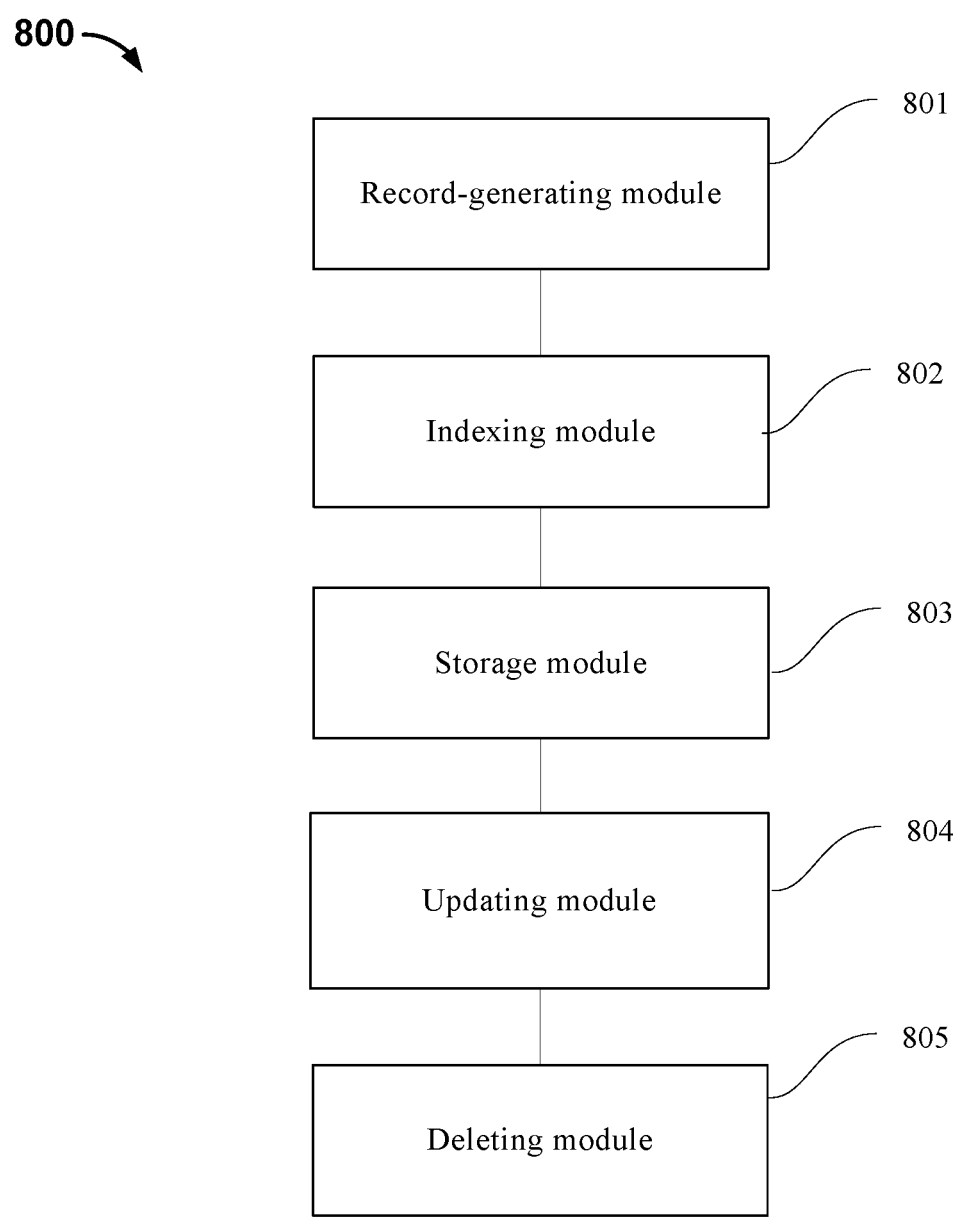
FIG. 8 is block diagram illustrating an embodiment of a device for processing user bookmark data of the present invention.

FIG. 8 is block diagram illustrating an embodiment of a device for processing user bookmark data of the present invention. System 800 includes: a record-generating module 801, configured to receive a bookmark-related action request and generate a bookmark data record that includes user information; an indexing module 802, configured to assign, based on user information, the specific database for saving the bookmark data record and to record the bookmark database information (e.g., the database ID of the specific database) in the index information; and a storage module 803, configured to save the current bookmark data record to the corresponding bookmark database according to its index information.

In this example, there are multiple databases located on different servers. The bookmark data of any one user is stored in the same bookmark database, and user information is also recorded in the index information.

In specific embodiments, the user information can be a user ID, and the indexing module specifically comprises the following sub-modules: a character string-generating sub-module, for generating a character string of a preset length according to the user identifier; a character string-calculating sub-module, for using a preset character string algorithm to perform calculations on the character string and obtain a calculation result that serves as bookmark database information.

In a preferred embodiment of the present invention, the bookmark data record may further comprise a unique bookmark record identifier generated for the current bookmark data record. In such a case, the index information further comprises the bookmark record identifier.

As an example of a specific application of the present invention, the record-generating module may comprise: a basic information-recording module, configured to receive a bookmark-related action request, and recording basic information of the user bookmark content in accordance with the bookmark-related action request, the basic information comprising user information, bookmark record identifier, and bookmark content identifier; an extended information-obtaining sub-module, configured to extract bookmark content extended information from the appropriate content database in accordance with the bookmark content identifier; a combining sub-module, configured to generate a bookmark data record based on the bookmark content basic information and extended information; specifically this can consist of combining the bookmark content basic information and extended information into a bookmark data record.

As an example of a specific application of the present invention, the bookmark content basic information may further comprise: bookmark type, bookmark time, valid data identifier, and expiration time.

When the bookmark content is a product, the content database may be a products database. The extended information of the bookmark content may comprise at least one of the following: product type, product price, and product publication time.

When the bookmark content is a shop, the content database may be a shop database, and the bookmark content extended information may include at least one of the following: shop name, seller name, shop main business, seller credit rating, shop promotional information, and user comments information.

In specific implementations, the system may further an index saving module, for saving the index information into an index database.

To ensure the validity of user bookmark data, the present embodiment of the invention may also comprise the modules below: an updating module 804, which is used when the extended information of the bookmark content in the content database changes, to look up, in accordance with the bookmark content identifiers, the corresponding bookmark content extended information in the bookmark databases and update such information.

When the user submits a delete request for bookmark data, the present embodiment of the invention may further comprise a deleting module 805. The deleting module 805 may specifically comprise the sub-modules below: a delete request receiving module, for receiving requests to delete bookmark data records; the requests comprising bookmark record identifiers; a database locating sub-module, for looking up, based on the bookmark record identifier, the corresponding index information in the index database and, in accordance with the bookmark database information recorded in the index information, locating the bookmark database; a bookmark deleting sub-module, for deleting from the bookmark database the bookmark data record corresponding to the bookmark record identifier; and an index-deleting sub-module, for deleting this piece of index information from the index database.

Figure 9:
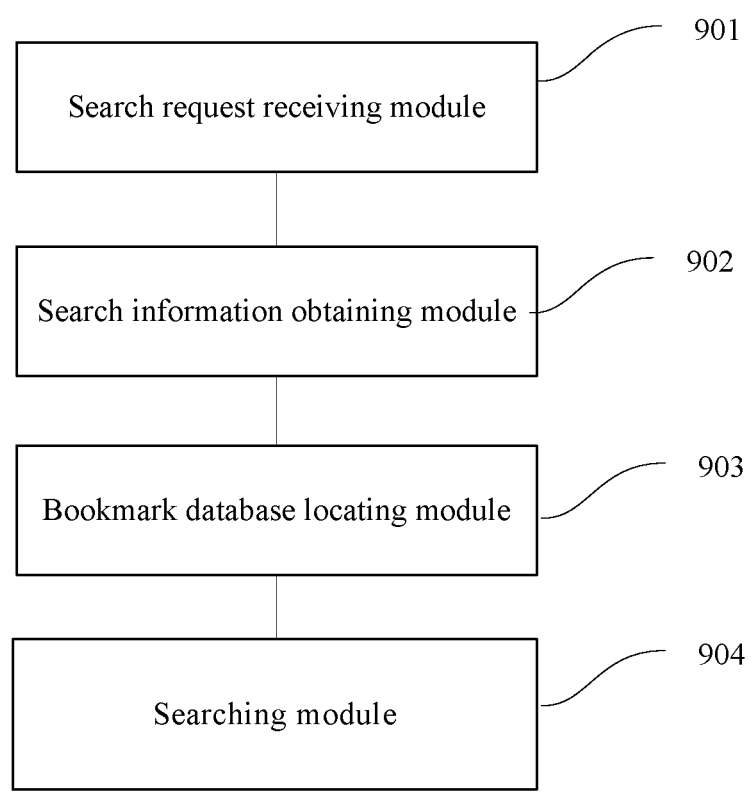
FIG. 9 is a block diagram illustrating another embodiment of a device for managing user bookmark data.

FIG. 9 is a block diagram illustrating another embodiment of a device for managing user bookmark data. In this example, user bookmark data is distributed across bookmark databases on different servers. The bookmark data of any one user is stored in the same bookmark database and includes one or more bookmark data records of the user. Each bookmark data record has corresponding index information. The index information comprises user information and bookmark database information for saving the current bookmark data record. The present embodiment includes: a search request receiving module 901, for receiving search requests; a search information obtaining module 902, for generating search information for the bookmark data in accordance with the search request, the search information comprising user information, search key words, and search conditions; a bookmark database locating module 903, for extracting bookmark database information corresponding to the user information from the index information; a search module 904, for searching search key words in the bookmark database according to search conditions and obtaining matched bookmark data records.

In a preferred embodiment of the present invention, the search request comprises user information and search key words. In such a case, the search information obtaining module may include the following sub-modules: a first condition-generating sub-module, for generating the corresponding search conditions based on the character type of the search key words and in accordance with pre-established rules.

As an example of the present embodiment in a specific application, the bookmark data record may comprise at least one of the following: product type, product price, product publication time, shop name, seller name, shop main business, seller credit rating, shop promotional information, and user comment information. In such a case, the pre-established rule may comprise: if the character type of the search key word is purely numeric, then generate search conditions for searching in product prices and shop promotional information; if the character type of the search key word includes text, then generate search conditions for searching in product type, product publication time, shop name, seller name, shop main business, seller credit rating, and user comments information.

In another preferred embodiment of the present invention, the search request comprises user information, search type, and search key word. In such a case, the search information obtaining module may comprise a second condition-generating sub-module, for generating the corresponding search conditions according to the search type.

As an example of the present embodiment in a specific application, the bookmark data record may include at least one of the following: product type, product price, product publication time, shop name, seller name, shop main business, seller credit rating, shop promotional information, and user comment information; the search type comprises product search, shop search, and extended search. In such a case, the second condition-generating sub-module may further comprise: a product type condition-generating unit, for generating search conditions for searching in shop name, seller name, product type, product price, and product publication time when the search type is product search; a shop type condition-generating unit, for when the search type is shop search, generating search conditions for searching in seller name, shop main business, and seller credit rating; an extension type condition-generating unit, for when the search type is extended search, generating search conditions for searching in user comments information and shop promotional information.

Figure 10:
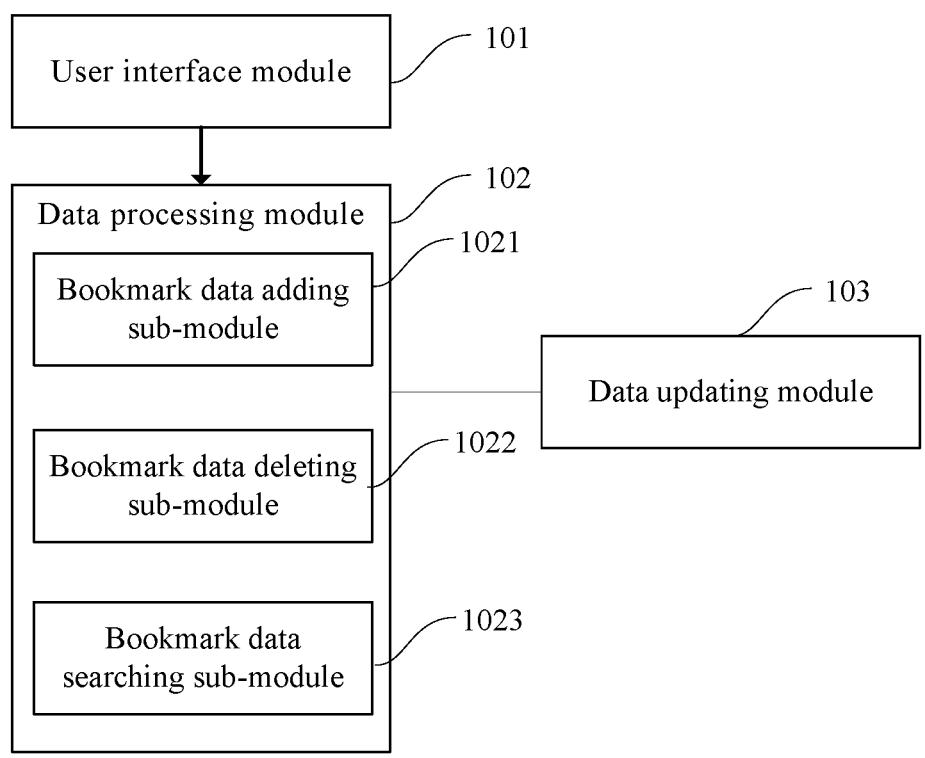
FIG. 10 is a block diagram of another embodiment of a user bookmark system.

FIG. 10 is a block diagram of another embodiment of a user bookmark system. System 1000 comprises: a user interface module 101, for receiving a user action, the action comprising adding data to the bookmark folder, deleting data from the bookmark folder, and searching data in the bookmark folder; a data processing module 102, which specifically can comprise a bookmark data adding sub-module 1021, a bookmark data deleting sub-module 1022, and a bookmark data searching sub-module 1023.

The bookmark data adding sub-module 1021 further comprises: a record generating unit, for generating bookmark data records according to add bookmark actions by the user, the bookmark data record comprising user information; an index unit, for assigning, according to the user information, a piece of bookmark database information for saving the bookmark data record and recording the bookmark database information in the index information; and a storage unit, for saving the current bookmark data record into the corresponding bookmark database according to the index information.

The bookmark data deleting sub-module 1022 includes: a database locating unit, for looking up, in accordance with the bookmark record identifier carried in user bookmark data delete action, the corresponding index information in the index database and locating the bookmark database according to the bookmark database information recorded in the index information; a bookmark database deleting unit, for deleting from the bookmark database the bookmark data record corresponding to the bookmark record identifier; and an index deleting unit, for deleting this piece of index information from the index database.

The bookmark data searching sub-module 1023 includes: a search information obtaining unit, for generating, in accordance with the user's bookmark data search action, search information for bookmark data, the search information comprising user information, search key words, and search conditions; a bookmark database locating unit, for extracting bookmark database information corresponding to the user information from the index information; and a search unit, for searching search key words in the bookmark database according to search conditions and obtaining matched bookmark data records.

In a preferred embodiment of the present invention, the user bookmark system is linked to a content database, and the bookmark data records include basic information and extended information for bookmark content. The bookmark content basic information comprises bookmark content identifiers. The system further comprises a data updating module 103, for when the extended information of the bookmark content in the content database changes, looking up, in accordance with the bookmark content identifiers, the corresponding bookmark content extended information in the bookmark databases and updating such information.

The modules or units described above can be implemented as software components executing on one or more general purpose processors, as hardware such as programmable logic devices and/or Application Specific Integrated Circuits, designed to perform certain functions or a combination thereof. In some embodiments, the modules and units can be embodied by a form of software products which can be stored in a nonvolatile storage medium (such as optical disk, flash storage device, mobile hard disk, etc.), including a number of instructions for making a computer device (such as personal computers, servers, network equipment, etc.) implement the methods described in the embodiments of the present invention. The modules or units may be implemented on a single device or distributed across multiple devices. The functions of the modules or units may be merged into one another or further split into multiple sub-modules or sub-units.

The present invention can be used in many general purpose or specialized computer system environments or configurations. For example: personal computers, servers, handheld devices or portable equipment, tablet-type equipment, multiprocessor systems, microprocessor-based systems, set-top boxes, programmable consumer electronic equipment, networked PCs, minicomputers, mainframe computers, distributed computing environments that include any of the systems or equipment above, and so forth.

The present invention can be described in the general context of computer executable commands executed by a computer, such as a program module. Generally, program modules include routines, programs, objects, components, data structures, etc. to execute specific tasks or achieve specific abstract data types. The present invention can also be realized in distributed computing environments; in such distributed computing environments, tasks are executed by remote processing equipment connected via communication networks. In distributed computing environments, program modules can be located on storage media at local or remote computers that include storage equipment.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for managing user bookmark data, comprising:
one or more processors configured to:
provide a user interface configured to receive a bookmark-related action request;
determine a type of action associated with the bookmark-related action request and user information associated with the bookmark-related action request;
in response to a determination that the type of action corresponds to an add bookmark action:
generate a bookmark data record, the bookmark data record comprising the user information and information to be bookmarked, wherein to generate the bookmark data record includes to obtain basic information from the bookmark-related action request, the basic information including a bookmark record identifier and a bookmark content identifier;
determine, using the user information, bookmark database information associated with a bookmark database to which the bookmark data record is to be stored, the bookmark database being one of at least one bookmark database;
generate index information based on the user information and the bookmark database information;
store the index information in an index database that is separate from the at least one bookmark database; and
store the bookmark data record in the bookmark database;
detect that information pertaining to a product or a shop in a backend content database has been updated;
look up, in the at least one bookmark database, a bookmark data record that corresponds to the product or the shop; and
update the bookmark data record that corresponds to the product or the shop based on the information that has been updated; and
one or more memories coupled with the one or more processors, wherein the one or more memories are configured to provide the one or more processors with instructions.

2. The system of claim 1, wherein the user information pertains to a user, and all bookmark data records associated with the user are stored in the at least one bookmark database.

3. The system of claim 1, wherein:
the index information includes the user information and the bookmark database information.

4. The system of claim 1, wherein
to generate the bookmark data record includes to obtain extended information from a content database.

5. The system of claim 1, wherein:
the one or more processors are further configured to:
in response to a determination that the information to be bookmarked includes a piece of product information, a content database is deemed to correspond to a product database storing product information; and
in response to a determination that the information to be bookmarked includes a piece of shop information, a content database is deemed to correspond to a shop database storing shop information.

6. The system of claim 1, wherein
to generate the bookmark data record includes to:
obtain extended information from a content database; and generate the bookmark data record based at least in part on the basic information and the extended information.

7. The system of claim 1, wherein in the event that the type of action corresponds to a delete bookmark action, the one or more processors are further configured to:
look up corresponding index information in an index database using user information included in the bookmark-related action request, the corresponding index information including corresponding bookmark database information associated with a corresponding bookmark database to which a bookmark data record to be deleted is stored;
locate the bookmark data record to be deleted in the corresponding bookmark database using a bookmark data record identifier included in the bookmark-related action request; and
delete the bookmark data record.

8. The system of claim 1, wherein:
in response to a determination that the type of action corresponds to a search bookmark action:
the user interface is further configured to receive a set of search key words; and
the one or more processors are further configured to:
generate a search condition based on a search request;
locate, in the index database, a corresponding bookmark database using user information included in the bookmark-related action request;
use the set of search key words to search for a matching bookmark data record, the search being performed in the corresponding bookmark database and in accordance with the search condition; and
present the matching bookmark data record to a user.

9. The system of claim 1, wherein:
in response to a determination that the type of action corresponds to a search bookmark action:
the user interface is further configured to receive a set of search key words; and
the one or more processors are further configured to:
generate a search condition based at least in part on a character type of the set of search key words;
locate, in the index database, a corresponding bookmark database using user information included in the bookmark-related action request;
use the set of search key words to search for a matching bookmark data record, the search being performed in the corresponding bookmark database and in accordance with the search condition; and
present the matching bookmark data record to a user.

10. A system for managing user bookmark data, comprising:
one or more processors configured to:
provide a user interface configured to receive a bookmark-related action request;
determine a type of action associated with the bookmark-related action request and user information associated with the bookmark-related action request, wherein the user information includes a user identifier;
detect that information pertaining to a product or a shop in a backend content database has been updated;
look up, in at least one bookmark database, a bookmark data record that corresponds to the product or the shop;
update the bookmark data record that corresponds to the product or the shop based on the information that has been updated; and
determine, using the user information, bookmark database information associated with a bookmark database to which the bookmark data record is to be stored, including:
generating a character string based on the user identifier; and
performing a hash function of the character string and using a result of the hash function to determine the bookmark database information; and
one or more memories coupled with the one or more processors, wherein the one or more memories are configured to provide the one or more processors with instructions.

11. A system for managing user bookmark data, comprising:
one or more processors configured to:
provide a user interface configured to receive a bookmark-related action request;
determine a type of action associated with the bookmark-related action request and user information associated with the bookmark-related action request;
in response to a determination that the type of action corresponds to a search bookmark action:
the user interface is further configured to receive a set of search key words; and
the one or more processors are further configured to:
generate a search condition based at least in part on a character type of the set of search key words or a search type associated with the search bookmark action, in response to a determination that the character type is purely numeric, the search condition specifies that a search is to be conducted based on product prices, shop promotional information, or both;
locate, in an index database, a corresponding bookmark database using the user information included in the bookmark-related action request;
use the set of search key words to search for a matching bookmark data record, the search being performed in the corresponding bookmark database and in accordance with the search condition; and
present the matching bookmark data record to a user;
detect that information pertaining to a product or a shop in a backend content database has been updated;
look up, in at least one bookmark database, a bookmark data record that corresponds to the product or the shop; and
update the bookmark data record that corresponds to the product or the shop based on the information that has been updated; and
one or more memories coupled with the one or more processors, wherein the one or more memories are configured to provide the one or more processors with instructions.

12. The system of claim 11, wherein:
in response to the determination that the type of action corresponds to the search bookmark action:
the one or more processors are further configured to:
in response to a determination that the character type is not purely numeric, the search condition specifies that a search is to be conducted based on one or more of: product type, product publication time, shop name, seller name, shop main business, seller credit rating, and user comments information.

13. The system of claim 11, wherein:
in response to the determination that the type of action corresponds to the search bookmark action:
the one or more processors are further configured to:
in response to a determination that the search type is product search, the search condition specifies that a search is to be conducted based on one or more of: shop name, seller name, product type, product price, and product publication time.

14. The system of claim 11, wherein:
in response to the determination that the type of action corresponds to the search bookmark action:
the one or more processors are further configured to:
in response to a determination that the search type is shop search, the search condition specifies that a search is to be conducted based on one or more of: seller name, shop main business, and seller credit rating.

15. The system of claim 11, wherein:
in response to a determination that the type of action corresponds to the search bookmark action:
the one or more processors are further configured to:
in response to a determination that the search type is extended search, the search condition specifies that a search is to be conducted based on one or more of: user comments information and shop promotional information.

16. A method for managing user bookmark data on a networked platform, comprising:
receiving, at an interface, a bookmark-related action request;
determining, using one or more processors, a type of action associated with the bookmark-related action request and user information associated with the bookmark-related action request;
in response to a determination that the type of action corresponds to an add bookmark action:
generating a bookmark data record, the bookmark data record comprising the user information and information to be bookmarked, the generating the bookmark data record including to obtain basic information from the bookmark-related action request, the basic information including a bookmark record identifier and a bookmark content identifier;
determining, using the user information, bookmark database information associated with a bookmark database to which the bookmark data record is to be stored, the bookmark database being one of at least one bookmark database;
generating index information based on the user information and the bookmark database information;
storing the index information in an index database that is separate from the at least one bookmark database; and
storing the bookmark data record in the bookmark database;
detecting that information pertaining to a product or a shop in a backend content database has been updated;
looking up, in the at least one bookmark database, a bookmark data record that corresponds to the product or the shop; and
updating the bookmark data record that corresponds to the product or the shop based on the information that has been updated.

17. A computer program product for managing user bookmark data on a networked platform, the computer program product being embodied in a tangible non-transitory computer readable storage medium and comprising computer instructions for:
receiving, at an interface, a bookmark-related action request;
determining a type of action associated with the bookmark-related action request and user information associated with the bookmark-related action request;
in response to a determination that the type of action corresponds to an add bookmark action:
generating a bookmark data record, the bookmark data record comprising the user information and information to be bookmarked, the generating the bookmark data record including to obtain basic information from the bookmark-related action request, the basic information including a bookmark record identifier and a bookmark content identifier;
determining, using the user information, bookmark database information associated with a bookmark database to which the bookmark data record is to be stored, the bookmark database being one of at least one bookmark database;
generating index information based on the user information and the bookmark database information;
storing the index information in an index database that is separate from the at least one bookmark database; and
storing the bookmark data record in the bookmark database;
detecting that information pertaining to a product or a shop in a backend content database has been updated;
looking up, in the at least one bookmark database, a bookmark data record that corresponds to the product or the shop; and
updating the bookmark data record that corresponds to the product or the shop based on the information that has been updated.

18. A method for managing user bookmark data on a networked platform, comprising:
receiving, at an interface, a bookmark-related action request;
determining, using one or more processors, a type of action associated with the bookmark-related action request and user information associated with the bookmark-related action request, wherein the user information includes a user identifier;
detecting that information pertaining to a product or a shop in a backend content database has been updated;
looking up, in at least one bookmark database, a bookmark data record that corresponds to the product or the shop;
updating the bookmark data record that corresponds to the product or the shop based on the information that has been updated; and
determining, using the user information, bookmark database information associated with a bookmark database to which the bookmark data record is to be stored, including:
generating a character string based on the user identifier; and
performing a hash function of the character string and using a result of the hash function to determine the bookmark database information.

19. A computer program product for managing user bookmark data on a networked platform, the computer program product being embodied in a tangible non-transitory computer readable storage medium and comprising computer instructions for:

receiving, at an interface, a bookmark-related action request;

determining a type of action associated with the bookmark-related action request and user information associated with the bookmark-related action request, wherein the user information includes a user identifier;

detecting that information pertaining to a product or a shop in a backend content database has been updated;

looking up, in at least one bookmark database, a bookmark data record that corresponds to the product or the shop;

updating the bookmark data record that corresponds to the product or the shop based on the information that has been updated; and determining, using the user information, bookmark database information associated with a bookmark database to which the bookmark data record is to be stored, including:

generating a character string based on the user identifier; and performing a hash function of the character string and using a result of the hash function to determine the bookmark database information.

20. A method for managing user bookmark data on a networked platform, comprising:

receiving a bookmark-related action request;

determining, using one or more processors, a type of action associated with the bookmark-related action request and user information associated with the bookmark-related action request;

in response to a determination that the type of action corresponds to a search bookmark action:

the one or more processors are further configured to:

receive a set of search key words;

generate a search condition based at least in part on a character type of the set of search key words or a search type associated with the search bookmark action, in response to a determination that the character type is purely numeric, the search condition specifies that a search is to be conducted based on product prices, shop promotional information, or both;

locate, in an index database, a corresponding bookmark database using the user information included in the bookmark-related action request;

use the set of search key words to search for a matching bookmark data record, the search being performed in the corresponding bookmark database and in accordance with the search condition; and present the matching bookmark data record to a user;

detecting that information pertaining to a product or a shop in a backend content database has been updated;

looking up, in at least one bookmark database, a bookmark data record that corresponds to the product or the shop; and updating the bookmark data record that corresponds to the product or the shop based on the information that has been updated.

21. A computer program product for managing user bookmark data on a networked platform, the computer program product being embodied in a tangible non-transitory computer readable storage medium and comprising computer instructions for:

receiving a bookmark-related action request;

determining a type of action associated with the bookmark-related action request and user information associated with the bookmark-related action request;

in response to a determination that the type of action corresponds to a search bookmark action:

receiving a set of search key words;

generating a search condition based at least in part on a character type of the set of search key words or a search type associated with the search bookmark action, in response to a determination that the character type is purely numeric, the search condition specifies that a search is to be conducted based on product prices, shop promotional information, or both;

locating, in an index database, a corresponding bookmark database using user information included in the bookmark-related action request;

using the set of search key words to search for a matching bookmark data record, the search being performed in the corresponding bookmark database and in accordance with the search condition; and presenting the matching bookmark data record to a user;

detecting that information pertaining to a product or a shop in a backend content database has been updated;

looking up, in at least one bookmark database, a bookmark data record that corresponds to the product or the shop; and updating the bookmark data record that corresponds to the product or the shop based on the information that has been updated.

\* \* \* \* \*